United States Patent [19]
Fukagawa et al.

[11] Patent Number: 5,611,593
[45] Date of Patent: Mar. 18, 1997

[54] AUTOMOTIVE FLOOR PANEL ASSEMBLY

[75] Inventors: Masami Fukagawa; Hidenori Matsumoto; Eisei Higuchi; Masuyuki Kakizaki, all of Saitama-ken, Japan

[73] Assignee: Honda Giken Kogyo Kabushiki Kaisha, Tokyo, Japan

[21] Appl. No.: 404,614

[22] Filed: Mar. 15, 1995

[30] Foreign Application Priority Data

Mar. 16, 1994 [JP] Japan .................................... 6-72703
Mar. 16, 1994 [JP] Japan .................................... 6-72704

[51] Int. Cl.$^6$ .................................................. B62D 25/20
[52] U.S. Cl. ............................ 296/204; 296/29; 296/187
[58] Field of Search .................................... 296/187, 191, 296/193, 194, 195, 203, 204, 209, 29

[56] References Cited

U.S. PATENT DOCUMENTS 5,002,333  3/1991  Kenmochi et al. ...................... 296/204
5,020,846  6/1991  Bonnett .................................. 296/193

*Primary Examiner*—Dean Kramer
*Attorney, Agent, or Firm*—Armstrong, Westerman, Hattori, McLeland & Naughton

[57] ABSTRACT

Disclosed is an automotive floor panel assembly, in which the floor panel assembly is stamp formed into a prescribed shape from at least one piece of sheet metal blank which consists of a first panel section made of sheet metal stock of a first thickness, and a second panel section made of sheet metal stock of a second thickness which are butt welded to each other along opposing edges thereof by using a high energy beam. Because the butt welding is carried out on flat panels, welding quality can be maintained at a high level without any substantial difficulty, and the resulting blank can have a highly uniform finish even though it includes a plurality of parts having different thicknesses. By suitably arranging the various parts having different thicknesses to different parts of the floor panel assembly in an optimum fashion, it is possible to achieve a maximum mechanical strength and a maximum rigidity with a minimum amount of material or involving a minimum weight. Also, the floor panel assembly can be applied either to a front floor panel assembly or to a rear floor panel assembly.

9 Claims, 9 Drawing Sheets

PRIOR ART

Fig. 14

PRIOR ART

Fig. 13

PRIOR ART

Fig. 15

PRIOR ART

AUTOMOTIVE FLOOR PANEL ASSEMBLY

TECHNICAL FIELD

The present invention relates to a vehicle floor panel assembly made of stamped sheet metal.

BACKGROUND OF THE INVENTION

Figure 12:
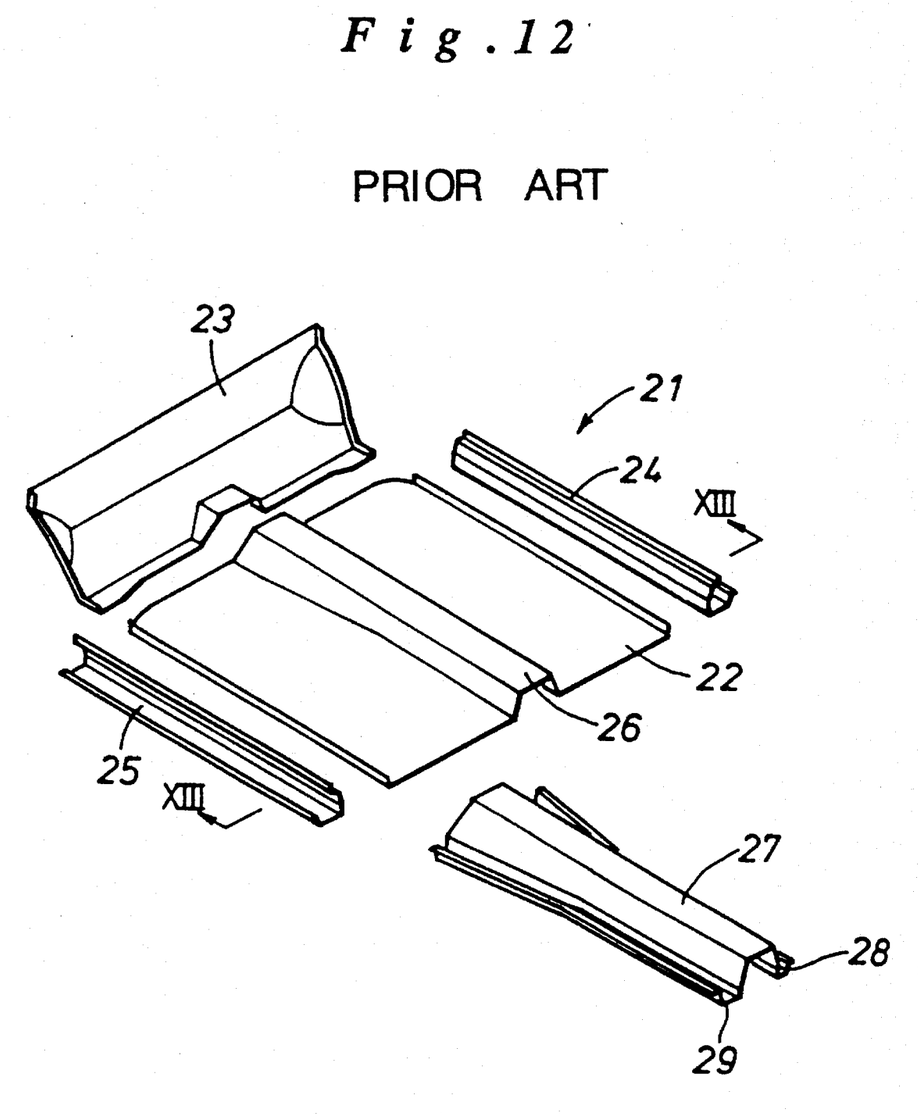
FIG. 12 is an exploded perspective view of a conventional front floor panel assembly.
Figure 13:
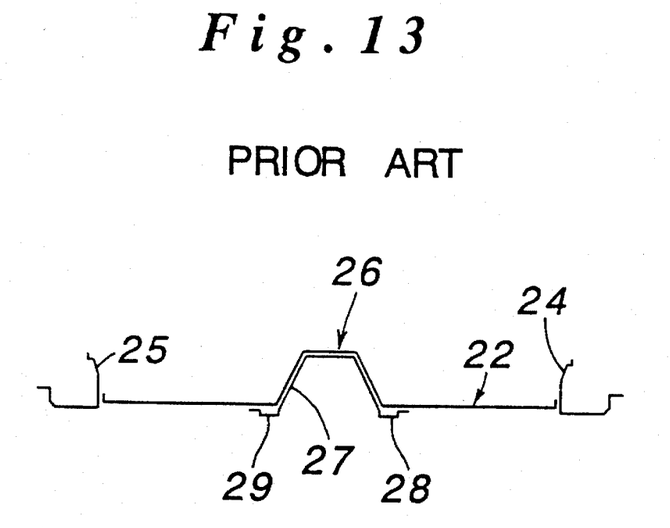
FIG. 13 is a sectional view taken along line XIII—XIII of FIG. 12.

As illustrated in FIGS. 12 and 13, a typical front floor panel assembly 21 for forming a front floor part of an automotive body typically consists of a front floor section 22, a dashboard section 23, and right and left side sill sections 24 and 25. A center tunnel section 26 projects upward from a laterally middle part of the front floor section 22 and extends over the entire length of the front floor section 22. The center tunnel section 26 provides a high rigidity and a high mechanical strength against bending deformation of the front floor panel assembly, and is also used for accommodating an exhaust pipe therein. In the case of a front engine rear drive vehicle, it can be used for accommodating a propeller shaft.

According to the conventional structure, the front floor section 22 and the side sill sections 24 and 25 are stamped out of sheet metal stock of different thicknesses, and are joined together along their edges by spot welding.

The dashboard section 23 must be adapted either to right hand side cars or to left hand side cars, and two different kinds of dashboard sections 23 must be prepared when both right hand side cars and left hand side cars are required to be assembled. Also, because the dashboard section 23 is relatively large and heavy, the assembling of the dashboard section 23 to the floor panel section 22 presented some problem in the production efficiency.

Additionally, slight gaps are inevitable in the spot welded parts of the front floor section 22 and the side sill sections 24 and 25, and a sealant must be carefully applied to these parts to exclude any intrusion of dust and moisture into the inner hollow sections of the front floor panel assembly. This means a substantial increase in the productions cost.

The center tunnel section and the floor panel sections are stamped from a same sheet of metal, and have a same thickness. Therefore, to ensure sufficient rigidity and mechanical strength, a stiffener 27 made of sheet metal having a relatively large thickness is spot welded to the center tunnel section 26 or the front floor sections 22. The stiffener 27 typically consists of front floor frame members 28 and 29 spot welded along either side of the center tunnel section 26. This caused a substantial increase in the weight of the front floor panel.

Figure 14:
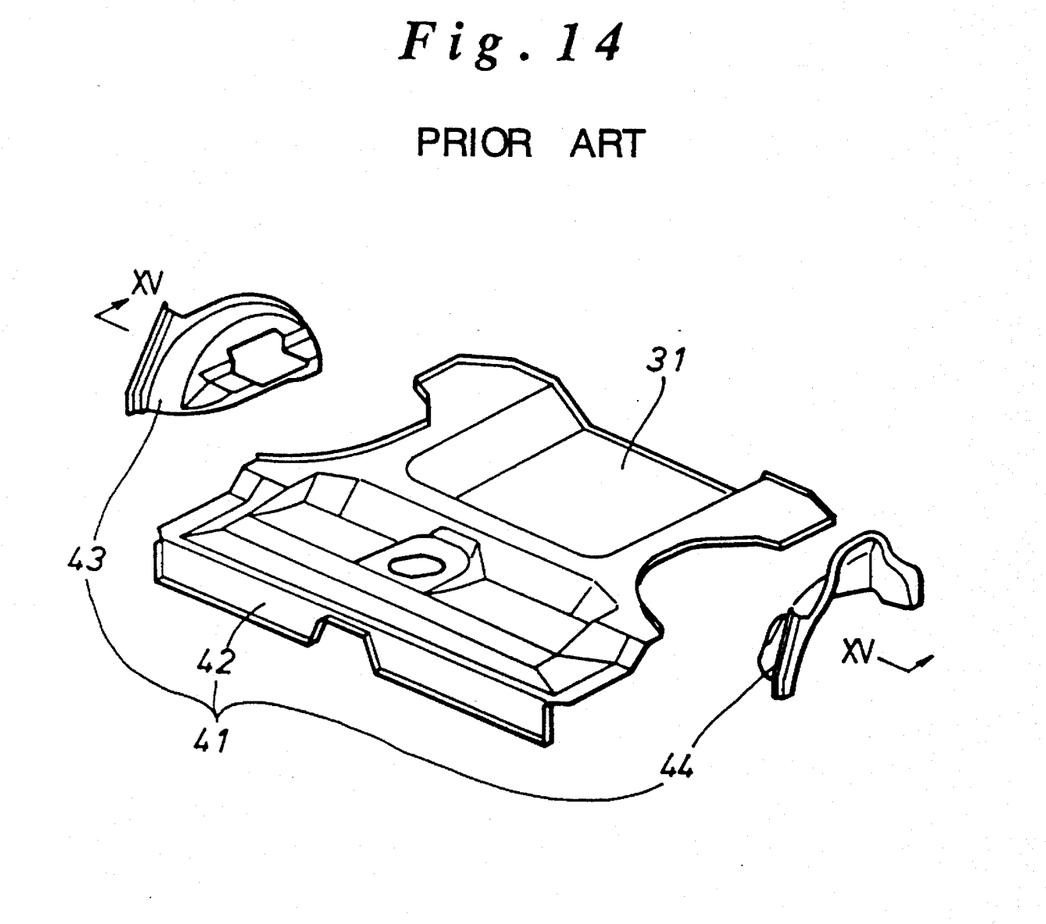
FIG. 14 is an exploded perspective view of a conventional rear floor panel assembly.
Figure 15:
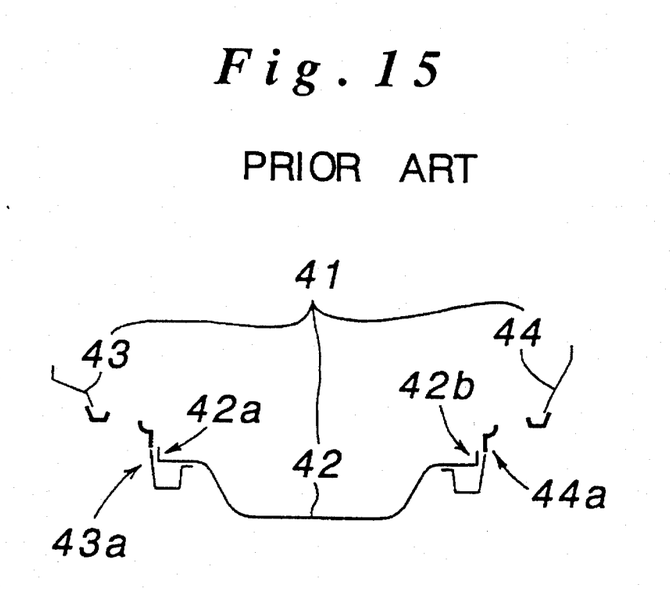
FIG. 15 is a sectional view taken along line XV—XV of FIG. 12.

As illustrated in FIGS. 14 and 15, a typical rear floor panel assembly 41 for forming a rear floor part of an automotive body comprises a rear floor section 42, and right and left rear wheel house sections 43 and 44. According to the conventional structure, the rear floor section 42 and the rear wheel house sections 43 and 44 are stamped from sheet metal stock of different thicknesses, and a flange 42a of the rear floor section 42 and a flange 43a of the fight rear wheel house section 43 are spot welded, and flanges 42a and 44a of the rear wheel section 42 and the left rear wheel house section 44 are similarly spot welded. Alternatively, the rear floor panel section 42 and the rear wheel house sections 43 and 44 may be integrally stamped from a single sheet of sheet metal.

When the rear floor panel 41 consists of three pieces of sheet metal which are spot welded together, the assembling work involved was highly difficult to carry out due to the complexity of the shapes of the parts to be welded, and the tortuous welding paths, and it was highly difficult to maintain the welding quality at a satisfactory level at all times. It was therefore often necessary to use bonding agents to supplement the function of the welding. As a result, the assembling work became highly complex, and the production cost accordingly was substantial.

When the rear floor panel is made of a single piece of sheet metal, the production process would be simplified. But, because the entire panel is of uniform thickness, a special measure must be taken to shield road noises from the rear tires. Typically, sound insulating/damping sheets are attached to the wheel houses. This adds to the weight and cost of the rear floor panel. It obviously would not be acceptable to increase the thickness of the entire rear floor panel.

Furthermore, stamping the entire rear wheel panel from a single piece of sheet metal involves a certain difficulty depending on the suitability of the sheet metal stock to draw work, and the depth of the wheel houses. For instance, a recess for receiving a spare tire cannot be made as deep as desired, and the recess may be made wider than actually necessary. As a result, the rear frame members which are attached to the lower surface of the rear floor panel and extend longitudinally on either side of the recess for a spare tire must be offset laterally to provide flange surfaces for spot welding without interfering with the spare tire recess. This will create some difficulty in passing the rear frame members longitudinally through the rear part of the vehicle, and may necessitate the rear frame members to be curved along either side of the spare tire recess. The resulting reduction in the mechanical strength of the rear frame members must be compensated for by using appropriate reinforcement members, and this will add to the production cost and the weight of the vehicle body.

BRIEF SUMMARY OF THE INVENTION

In view of such problems of the prior art, a primary object of the present invention is to provide an automotive floor panel assembly which has a maximum mechanical strength with a minimum weight.

A second object of the present invention is to provide an automotive floor panel assembly which requires a minimum amount of work for production and is therefore economical to produce.

A third object of the present invention is to provide an automotive floor panel assembly which involves a minimum amount of spot welding and can thereby provide a more integral assembly than has been possible heretofore.

A fourth object of the present invention is to provide an automotive floor panel assembly which is relatively free from gaps that need to be filled with a sealant.

A fifth object of the present invention is to provide an automotive floor panel assembly which can be formed into a desired shape at will.

A sixth object of the present invention is to provide an automotive floor panel assembly which can be easily adapted to minor changes without changing the entire floor panel design.

These and other objects of the present invention can be accomplished by providing an automotive floor panel assembly, wherein: the floor panel assembly is stamp formed into a prescribed shape from at least one piece of sheet metal blank which consists of a first panel section made of sheet metal stock of a first thickness, and a second panel section made of sheet metal stock of a second thickness which are butt welded to each other along opposing edges thereof. It can be conveniently fabricated by a method comprising the steps of: preparing a blank by butt welding two pieces of sheet metal of different thicknesses along opposing edges thereof; and stamp forming the blank into a prescribed shape for the automotive floor panel assembly.

The butt welding methods using high energy beams such as plasma welding and laser welding will produce good results. Because the butt welding is carried out on flat panels, welding quality can be maintained at a high level without any substantial difficulty, and the resulting blank can have a highly uniform finish even though it includes a plurality of parts having different thicknesses. By suitably arranging the various parts having different thicknesses to different parts of the floor panel assembly in an optimum fashion, it is possible to achieve a maximum mechanical strength and a maximum rigidity with a minimum amount of material or involving a minimum weight. Also, the floor panel assembly can be applied either to a front floor panel assembly or to a rear floor panel assembly.

In case of a front floor panel assembly, it typically includes a front floor section, and a dashboard section, the dashboard section including a dashboard lower section which extends integrally from the front floor section, and a dashboard upper section which is spot welded to a front edge of the dashboard lower section, the front floor section being formed from at least one piece of sheet metal blank formed by butt welding first and second panel sections having mutually different thicknesses to each other along opposing edges thereof. Typically, side sill sections are formed by parts having a relatively large thickness, and a necessary mechanical strength can be achieved without requiring many additional stiffeners. Additionally, the front floor panel assembly can be readily adapted either to a right hand car or to a left hand car simply by selecting an appropriate dashboard upper section, and the remaining part of the front floor panel assembly may be common to both types of car.

According to a preferred embodiment, the front floor section includes a center tunnel section, right and left main floor sections, and a pair of side sill sections, and is stamp formed from two pieces of sheet metal blank which are then spot welded to each other along a middle line of the center tunnel section, each of the side sill sections and two halves of the center tunnel section corresponding to a part of the sheet metal blank having a relatively large thickness. Alternatively, the front floor section may be stamp formed from three pieces of sheet metal blank which are then spot welded to each other along a pair of seam lines extending on either side of the center tunnel section, each of the side sill sections corresponding to a part of the sheet metal blank having a relatively large thickness. In the latter case, a change in the width of the vehicle body can be accommodated simply by suitably selecting the center piece or the side pieces of the blank, and a large part of the front floor panel assembly can be used without any substantial change. Typically, the middle one of the three pieces of sheet metal blank corresponding to the center tunnel section is made of sheet metal stock having a relatively large thickness.

In the case of a rear floor panel assembly, it normally includes a rear floor section having a recess for receiving a spare tire formed therein, and a pair of wheel house sections disposed on either side of the rear floor section, the rear floor section being formed from at least one piece of sheet metal blank formed by butt welding first panel section and a pair of second panel sections, having a relatively large thickness and disposed on either side of the first panel section, to each other along opposing edges thereof, the second panel sections corresponding to the wheel house sections. Thus, the wheel house sections can be formed from sheet metal stock having a relatively large thickness, and the road noise from the rear wheels can be effectively controlled without requiring any massive sound insulating material, and the overall weight of the rear wheel panel assembly can be minimized. Also, the assembling work is substantially simplified because the welding work is limited to the butt welding of flat panel sheets, and the need for spot welding involving complex seam lines can be eliminated. In particular, because the spare tire recess is formed by stamp forming the first panel section having a relatively small thickness, it is possible to accomplish a relatively deep draw work, and the lateral expanse of the spare tire recess can be minimized for a given size of spare tire. As a result, longitudinally extending rear floor frame members can be passed along either side of the spare tire recess with a minimum lateral offset, and a sufficiency of the mechanical strength of the rear floor frame members can be ensured relatively easily.

According to a preferred embodiment, the rear floor section is formed from at least two pieces of sheet metal blank each formed by butt welding an inner panel section and an outer panel section having a greater thickness than the inner panel section along opposing edges thereof, the outer panel section corresponding to an associated one of the wheel house sections.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
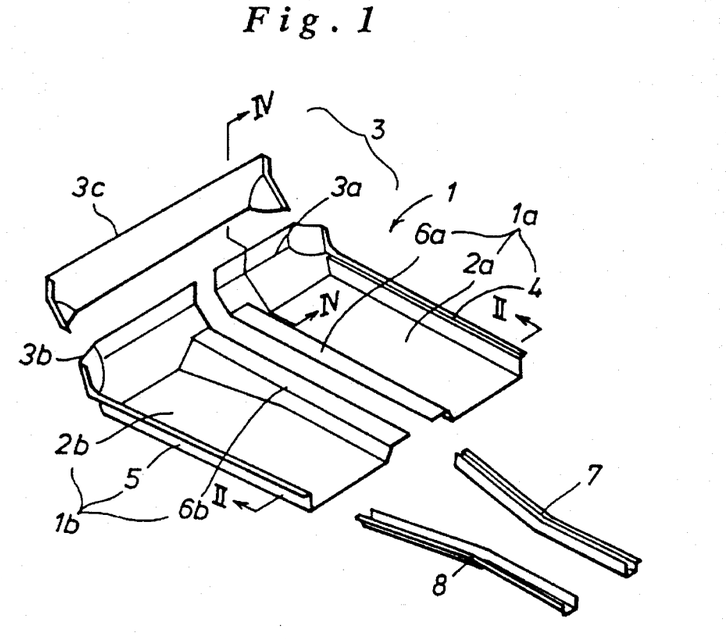
FIG. 1 is an exploded perspective view of a first embodiment of the present invention in the form of a front floor panel assembly.
Figure 2:
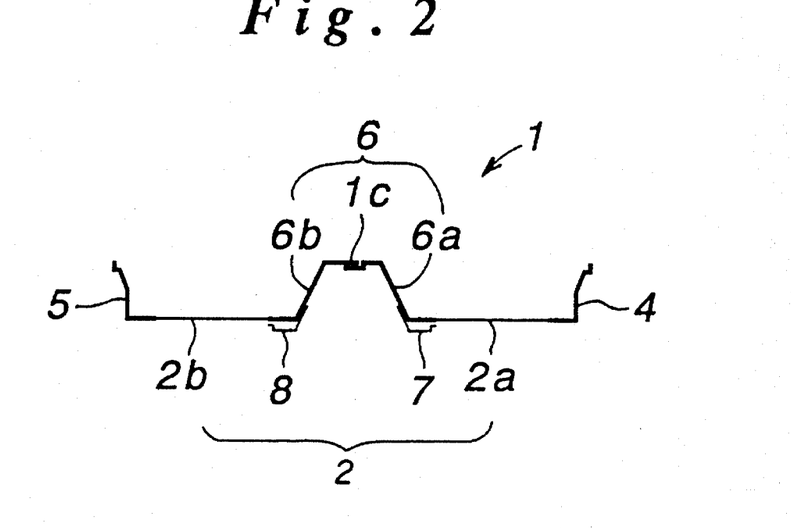
FIG. 2 is a sectional view taken along line II—II of FIG. 1.

FIGS. 1 and 2 show a first embodiment of the present invention implemented as an automotive front floor panel assembly. This front floor panel assembly 1, in its assembled state, consists of a front floor section 2, a dashboard section 3 connected to the front edge of the front floor section 2, and fight and left side sill sections 4 and 5 which are made of a relatively thick sheet metal stock. A center tunnel section 6 projecting upward is defined in a laterally middle part of the front floor section 2 and extends over the entire length of the front floor section 2. The center tunnel section 6 defines a recess on the lower surface of the front panel section 2 for accommodating an exhaust pipe and other components that need to be passed under the front floor section 2. A pair of front floor frame members 7 and 8 are attached to the lower surface of the front floor section 2 on either side of the center tunnel section 6.

In this embodiment, the front floor panel assembly 1 comprises right and left halves 1a and 1b which are spot welded together along a central weld seam 1c which is provided by associated peripheral flanges of the two floor panel halves 1a and 1b placed one over the other. In other words, the fight floor panel half 1a consists of a fight half 6a of the center tunnel section 6, a fight front floor section 2a, and the fight sill section 4, and the left floor panel half 1b consists of a left half 6b of the center tunnel section 6, a left front floor section 2b, and the left sill section 5. The dashboard section 3 consists of a fight dashboard lower 3a extending integrally from the right floor section 2a, a left dashboard lower 3b extending integrally from the left floor section 2b, and a dashboard upper 3c which is spot welded to the front edges of the fight and left dashboard lowers 3a and 3b.

Figure 3:
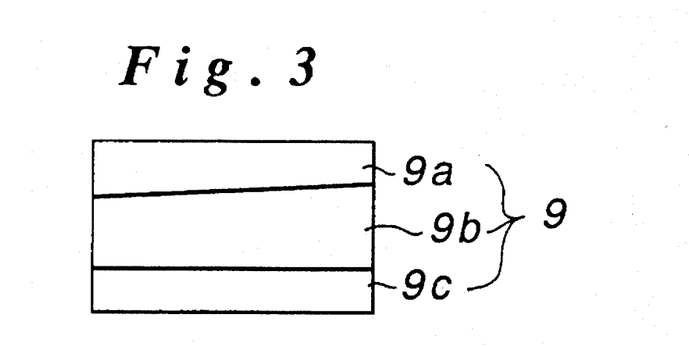
FIG. 3 is a plan view of the blank for forming a main part of the front floor panel assembly of FIG. 1.

The front floor panel assembly 1 is constructed as described in the following with reference to FIGS. 3 and 4.

First of all, a pair of blank pieces 9 for the fight and left halves 1a and 1b of the assembly are prepared by a welding process using a high energy beam such as plasma welding and laser welding. Namely, each of the blank pieces 9 consists of a middle section 9b made of a relatively thin sheet metal stock, an outer section 9a and an inner section 9c which are made of a relatively thick sheet metal stock and butt welded to either lateral side of the middle section 9b. The two blank pieces 9 are each basically a mirror image of the other, and only one of them is mentioned in most part of the following description. The weld seams are appropriately finished, for instance by grinding, and the blank 9 is stamp formed into a required shape. The outer section 9a corresponds to the sill section 4 or 5 of the corresponding floor panel half, and the inner section 9c corresponds to the half 6a or 6b of the center tunnel section 6 of the corresponding floor panel half.

Figure 4:
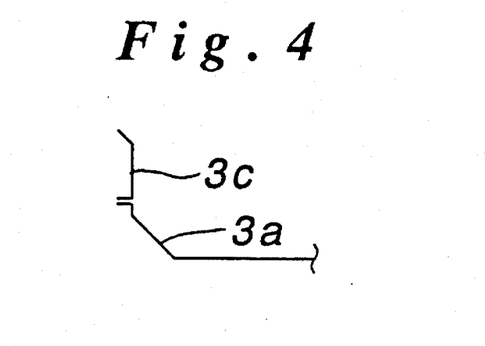
FIG. 4 is a sectional view taken along line IV—IV of FIG. 1.

The thus prepared two halves of the front floor panel assembly, FIGS. 2 and 4, are spot welded along the central weld seam 1c, and the dashboard upper 3c is likewise spot welded to the front edges of the dashboard lowers 3a and 3b. Finally, the front floor frame members 7 and 8, FIG. 2 are spot welded to the lower surface of the front floor section 2.

Thus, the side sill sections 4 and 5 are welded to the front floor section 2 substantially without any discontinuity, and application of a sealant to this part of the front floor panel assembly is made unnecessary. Because the welding between the side sill section and the front floor section is carried out between the flat blank pieces for these parts, a high quality welding is possible, and the thickness of the side sill section can be differentiated from the front floor section at will.

Furthermore, this embodiment allows the assembly to be adapted to right hand side cars and left hand side cars with a minimum modification. More specifically, a primary difference between a right hand side car and a left hand side car is the location of the steering column which is passed through and secured to the dashboard upper, and the assembly of this embodiment can be readily adapted to either type of car simply by selecting an appropriate dashboard upper. The remaining part of the assembly can be used for both right hand side cars and left hand side cars with a minimum amount of modification.

Figure 5:
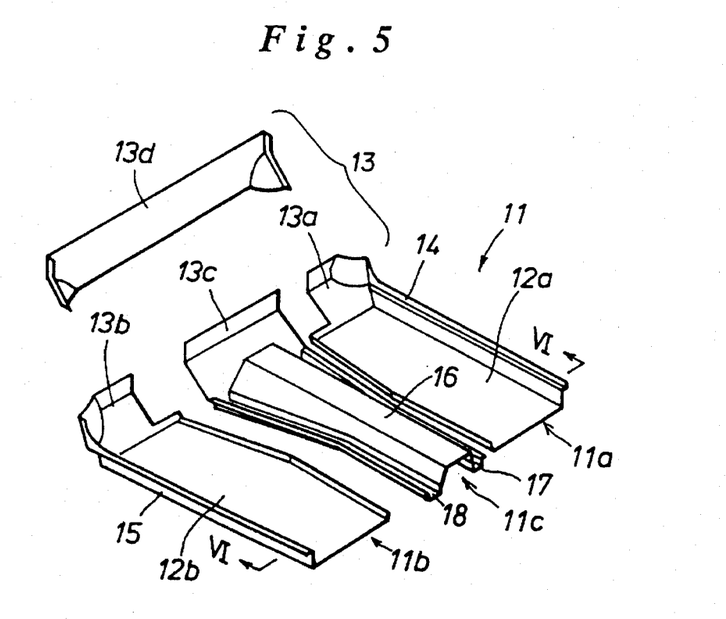
FIG. 5 is a view similar to FIG. 1 showing a second embodiment of the present invention in the form of a front floor panel assembly.
Figure 6:
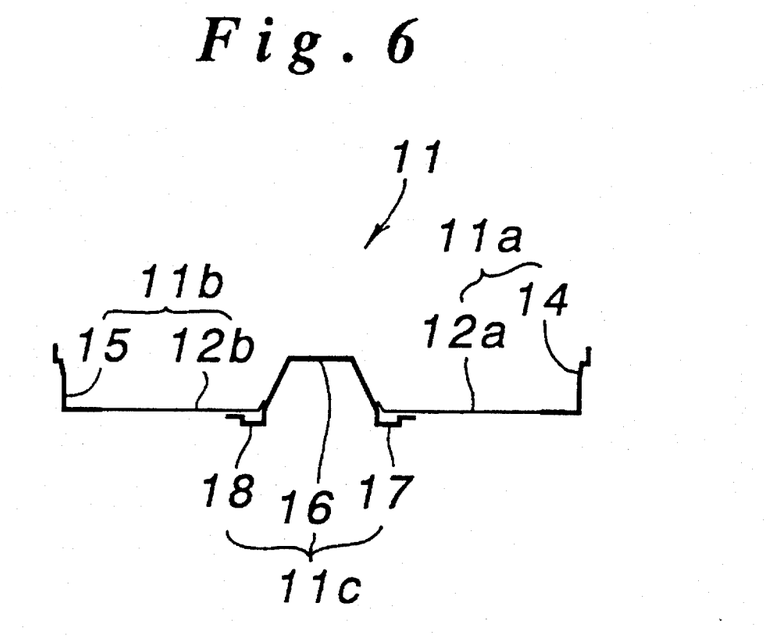
FIG. 6 is a sectional view taken along line VI—VI of FIG. 5.

FIGS. 5 and 6 show a second embodiment of the present invention constructed as a front floor panel assembly. This front floor panel assembly 11 comprises a middle section 11c, and right and left sections 11a and 11b which are spot welded to either side edge of the middle section 11c. Each of the fight and left sections 11a and 11b is a mirror image of the other. The right section 11a consists of a right front floor section 12a and a relatively thick fight side sill section 14, and the left section 11b consist of a left front floor section 12b and a relatively thick left side sill section 15. The middle section 11c, FIG. 6 consists of a relatively thick center tunnel section 16 and front floor frame members 17 and 18 integrally attached to the center tunnel section 16.

A front end of the front panel assembly 11, FIG. 5, consists of a dashboard section 13 which is made up of a right dashboard lower section 13a integrally extending from the right section 11a, a left dashboard lower section 13b integrally extending from the left section 11b, and a middle dashboard lower section 13c integrally extending from the middle section 11c, and a dashboard upper section 13d which is spot welded to the front edges of the dashboard lower sections 13a, 13b and 13c.

Figure 7:
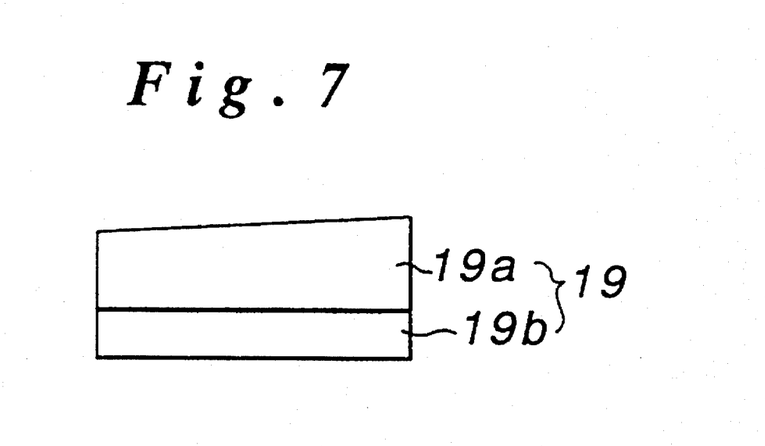
FIG. 7 is a plan view of the blank for forming a main part of the front floor panel assembly of FIG. 5.

The right section 11a is made by butt welding the right floor section 12a to the right side sill section 14, and the left section 11b is made by butt welding the left floor section 12b to the left side sill section 15, by using a high energy beam in each case. FIG. 7 shows a blank piece 19 thus prepared for the right section 11a. The blank piece 19 consists of an inner section 19a which is intended to form the right floor section 12a, and an outer section 19b which is made of sheet metal of a relatively thick stock, and intended to form the side sill section 14. The right and left sections 11a and 11b are then stamp formed from such blank pieces 19 into the prescribed shapes. The middle section 11c has a uniform thickness, and is made simply by stamp forming a single piece of sheet metal. The front floor panel assembly 11 is completed by spot welding the right and left sections 11a and 11b to the middle section 11c, and then the dashboard upper section to the dashboard lower sections 13a, 13b and 13c.

According to the second embodiment, in addition to the advantages of the first embodiment, an even greater adaptability can be achieved. For instance, a slight change in the lateral width of the front floor panel assembly can be readily accomplished by changing only the middle section, or by changing only the right and left side sections. The remaining pans can be used without any substantial change.

As a further modification, it is also possible to form the entire front floor panel from a single blank piece consisting of a middle section and a pair of side sill sections having a relatively large thickness and butt welded to either side of the middle section. According to this modified embodiment, the middle section of the blank covers the right and left floor panel sections as well as the center tunnel section.

Figure 8:
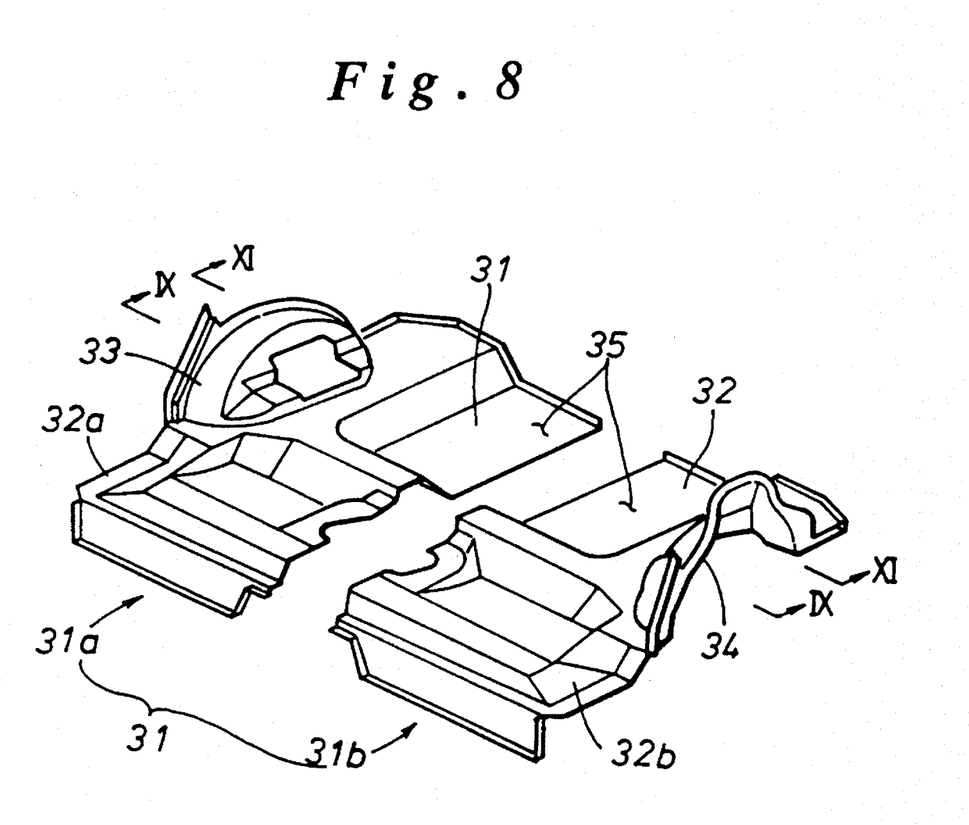
FIG. 8 is an exploded perspective view of a fourth embodiment of the present invention in the form of a rear floor panel assembly.
Figure 9:
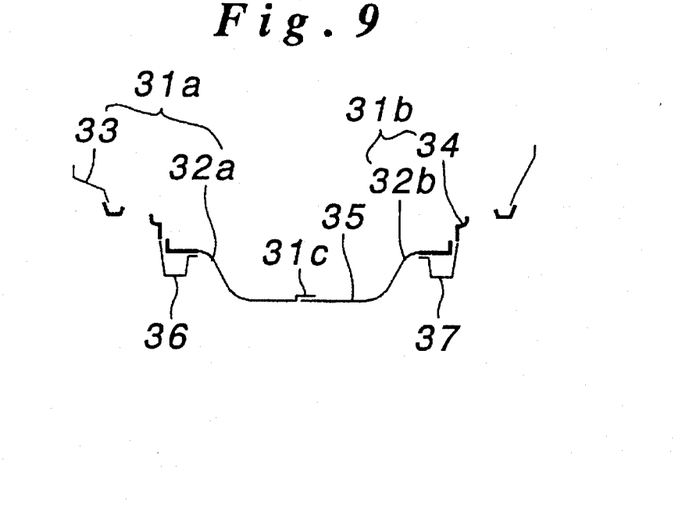
FIG. 9 is a sectional view taken along line IX—IX of FIG. 8.

FIGS. 8 and 9 show a third embodiment of the present invention which is constructed as a rear floor panel assembly. This rear floor panel assembly 31 comprises a rear floor section 32, and right and left rear wheel house sections 33 and 34 which have a relatively large thickness and are integrally attached to either side edge of the rear floor section 32. A recess 35 is provided in a central part of the rear floor section 32 for receiving a spare tire therein in a conventional manner. A pair of longitudinally extending rear floor frame members 36 and 37 are fixedly attached to the lower surface of the rear floor section 32 along either side of the spare tire recess 35.

Figure 10:
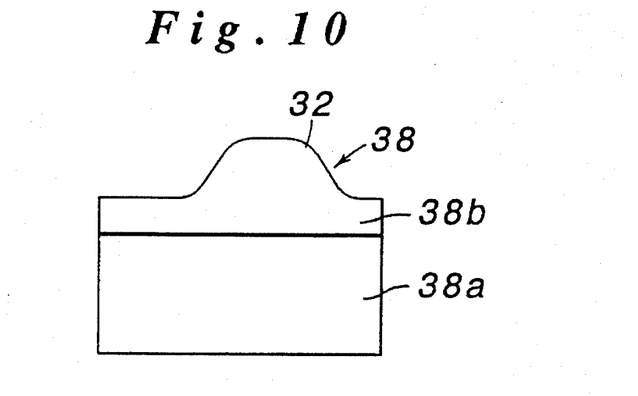
FIG. 10 is a plan view of the blank for forming a main part of the rear floor panel assembly of FIG. 8.

In this embodiment, the rear floor panel assembly 31 is assembled by spot welding right and left sections 31a and 31b along a welding seam 31c. Again, the right and left sections 31a and 31b are symmetric about the welding seam 31c, and are each a mirror image of the other. FIG. 10 shows a blank piece 38 for forming the right section 31a. This blank piece 38 consists of an inner section 38a and an outer section 38b which are butt welded to each other by using a high energy beam. The outer section 38b has a greater thickness than the inner section 38a. By stamp forming this blank piece 38, the inner section 38a of the blank piece 38 is formed into the right rear floor section 32a while the outer section 38b of the blank piece 38 is formed into the right wheel house section 33.

Thus, the rear floor section and the wheel house sections are joined together with minimum discontinuity, and there are no gaps that need to be filled by a sealant. The welding quality of the welding seams between the wheel house sections and the rear floor sections can be ensured without much difficulty because the welding can be carried out as butt welding of flat panels. The subsequent assembly work is simplified because the amount of spot welding can be reduced, and the need for the application of a sealant can be minimized. And, the need for spot welding two pieces of panel members along welding seams of complicated shapes.

Figure 11:
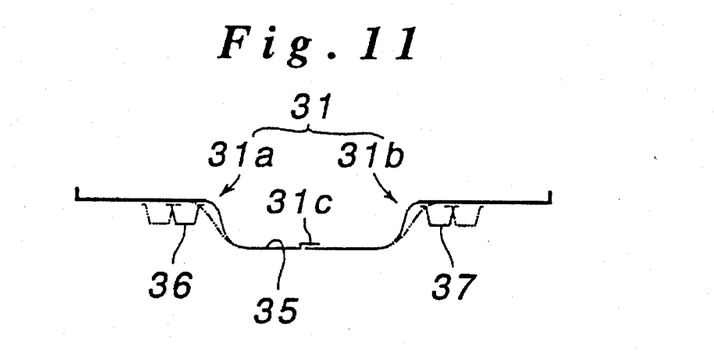
FIG. 11 is a sectional view taken along line XI—XI of FIG. 8.

FIG. 11 shows how the fight and left sections of the rear wheel floor panel assembly 31 are spot welded to each other. According to the present invention, the spare tire recess 35 can be drawn more deeply than was possible with the conventional structure in which the rear floor section and the wheel house sections are stamped from a single piece of sheet metal. The imaginary line in FIG. 11 indicates the contour of the rear floor panel assembly of the conventional structure. As can be readily seen from FIG. 11, according to the present invention, the rear floor frames 36 and 37 can be passed relatively straight through the rear floor panel assembly, and the need for any additional stiffener members can be eliminated.

Figure 11A:
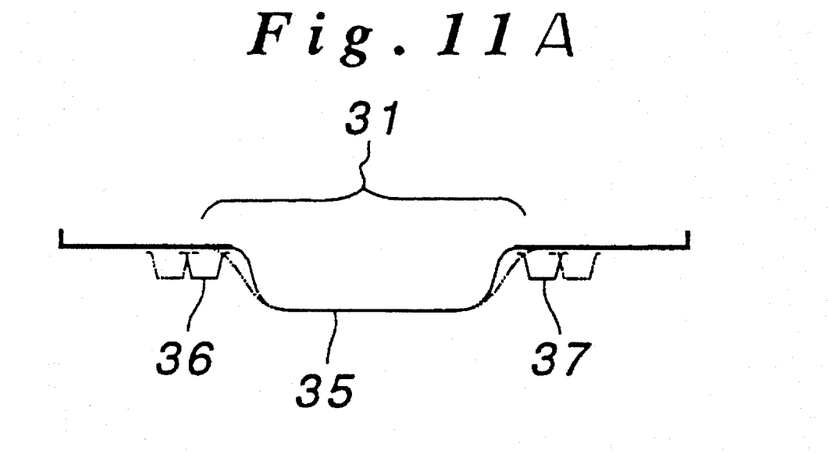
FIG. 11A is a view similar to FIG. 11 but showing the rear floor panel as a single sheet.

According to this embodiment, the rear wheel floor panel assembly 31 consisted of the fight and left sections 31a and 31b which are welded along the welding seam 31c, but it is also possible as a modified embodiment as shown in FIG. 11A to form the rear floor panel from a single piece of sheet metal blank consisting of a middle piece and a pair of outer pieces of a relatively thick sheet metal stock which are butt welded to either side edge of the middle piece.

Although the present invention has been described in terms of preferred embodiments thereof, it is obvious to a person skilled in the art that various alterations and modifications are possible without departing from the scope of the present invention which is set forth in the appended claims.

What is claim is:

1. An automotive floor panel assembly, wherein:
   said floor panel assembly is stamp formed into a prescribed shape from at least one piece of sheet metal blank which consists of a first panel section made of sheet metal stock of a first thickness, and a second panel section made of sheet metal stock of a second thickness which are butt welded to each other along opposing edges thereof.

2. An automotive floor panel assembly according to claim 1, wherein said floor panel assembly comprises a front floor panel assembly including a front floor section, and a dashboard section, said dashboard section including a dashboard lower section which extends integrally from said front floor section, and a dashboard upper section which is spot welded to a front edge of said dashboard lower section, said front floor section being formed from at least one piece of sheet metal blank formed by butt welding first and second panel sections having mutually different thicknesses to each other along opposing edges thereof.

3. An automotive floor panel assembly according to claim 2, wherein said front floor section includes a side sill section which is stamp formed from a common piece of sheet metal blank, said side sill section corresponding to a part of said sheet metal blank having a relatively large thickness.

4. An automotive floor panel assembly according to claim 2, wherein said front floor section includes a center tunnel section, right and left main floor sections, and a pair of side sill sections, and is stamp formed from two pieces of sheet metal blank which are then spot welded to each other along a middle line of said center tunnel section, each of said side sill sections and two halves of said center tunnel section corresponding to a part of said sheet metal blank having a relatively large thickness.

5. An automotive floor panel assembly according to claim 2, wherein said front floor section includes a center tunnel section, right and left main floor sections, and a pair of side sill sections, and is stamp formed from three pieces of sheet metal blank which are then spot welded to each other along a pair of seam lines extending on either side of said center tunnel section, each of said side sill sections corresponding to a part of said sheet metal blank having a relatively large thickness.

6. An automotive floor panel assembly according to claim 5, wherein a middle one of said three pieces of sheet metal blank corresponding to said center tunnel section is made of sheet metal stock having a relatively large thickness.

7. An automotive floor panel assembly according to claim 1, wherein said floor panel assembly comprises a rear floor panel assembly including a rear floor section having a recess for receiving a spare tire formed therein, and a pair of wheel house sections disposed on either side of said rear floor section, said rear floor section being formed from at least one piece of sheet metal blank formed by butt welding first panel section and a pair of second panel sections, having a relatively large thickness and disposed on either side of said first panel section, to each other along opposing edges thereof, said second panel sections corresponding to said wheel house sections.

8. An automotive floor panel assembly according to claim 1, wherein said floor panel assembly comprises a rear floor panel assembly including a rear floor section having a recess for receiving a spare tire formed therein, and a pair of wheel house sections disposed on either side of said rear floor section, said rear floor section being formed from at least two pieces of sheet metal blank each formed by butt welding an inner panel section and an outer panel section having a greater thickness than said inner panel section along opposing edges thereof, said outer panel section corresponding to an associated one of said wheel house sections.

9. A method for fabricating an automotive floor panel assembly, comprising the steps of:

preparing a blank by butt welding two pieces of sheet metal of different thicknesses along opposing edges thereof; and stamp forming said blank into a prescribed shape for said automotive floor panel assembly.

* * * * *